United States Patent [19]
Alexander

[11] Patent Number: 6,062,796
[45] Date of Patent: May 16, 2000

[54] VEHICLE RESTRAINT SENSING SYSTEM

[75] Inventor: James C. Alexander, London, Canada

[73] Assignee: United Dominion Ind., Inc., Charlotte, N.C.

[21] Appl. No.: 09/035,032

[22] Filed: Mar. 5, 1998

Related U.S. Application Data

[63] Continuation-in-part of application No. 08/921,019, Aug. 29, 1997.

[51] Int. Cl.⁷ .................................................. B65G 69/00
[52] U.S. Cl. ............................................................ 414/401
[58] Field of Search .................................. 414/396, 401, 414/584; 14/71.1

[56] References Cited

U.S. PATENT DOCUMENTS

| | | | |
|---|---|---|---|
| 4,127,856 | 11/1978 | Bickel | 340/687 |
| 4,267,748 | 5/1981 | Grunewald et al. | 74/529 |
| 4,282,621 | 8/1981 | Anthony et al. | 14/71.1 |
| 4,488,325 | 12/1984 | Bennett et al. | 14/71.3 |
| 4,553,895 | 11/1985 | Ellis | 414/401 |
| 4,692,755 | 9/1987 | Hahn | 340/687 |
| 4,695,216 | 9/1987 | Erlandsson | 414/401 |
| 4,759,678 | 7/1988 | Hageman | 414/401 |
| 4,830,563 | 5/1989 | Yeakle | 414/401 |
| 4,843,373 | 6/1989 | Trickle et al. | 340/540 |
| 4,938,647 | 7/1990 | Erlandsson | 414/401 |
| 4,946,330 | 8/1990 | Pedersen et al. | 414/401 |
| 5,120,181 | 6/1992 | Alexander | 414/401 |
| 5,297,921 | 3/1994 | Springer et al. | 414/401 |
| 5,336,033 | 8/1994 | Alexander | 414/401 |
| 5,505,575 | 4/1996 | Alexander | 414/401 |
| 5,702,223 | 12/1997 | Hahn et al. | 414/401 |

OTHER PUBLICATIONS

Rite Hite Owner's Manual for Model ADL–400, 1994, Pub. No. 1088.
Rite Hite Owner's Manual for Service–Repair Parts for DOK–LOK™, Apr., 1980, Publ. No. 033.
Serco Owner's Manual for Automatic Vehicle Restraint Model: VR 450.
Kelley Truk Stop Owner's Manual, 1982.

*Primary Examiner*—Steven A. Bratlie
*Attorney, Agent, or Firm*—Sughrue, Mion, Zinn, Macpeak & Seas, PLLC

[57] ABSTRACT

A vehicle restraint having a fixed member such as a frame mounted to a dock face and a hook movable relative to the fixed member for engaging a portion of a vehicle and restraining movement of the vehicle away from the dock. A non-contact sensor is employed to determine engagement of the hook with a portion of the vehicle. The sensor is positioned to provide an effective magnetic field in the zone of contact so that engagement with an ICC bar on the vehicle can be ascertained. The sensor may also be a sensor bar pivotally movable respect to a vertical restraining member. The sensor bar houses a sensor that determines relative movement between itself and a target to provide a signal indicative of engagement when the sensor bar is depressed by the vehicle.

7 Claims, 10 Drawing Sheets

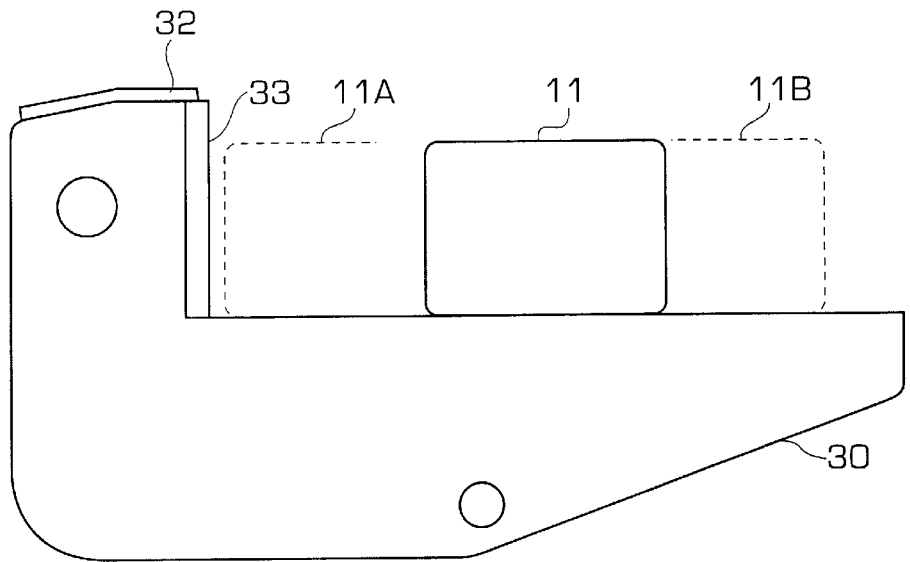
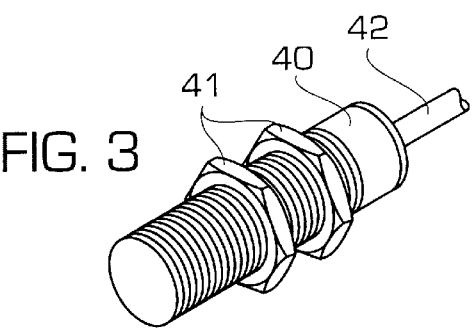
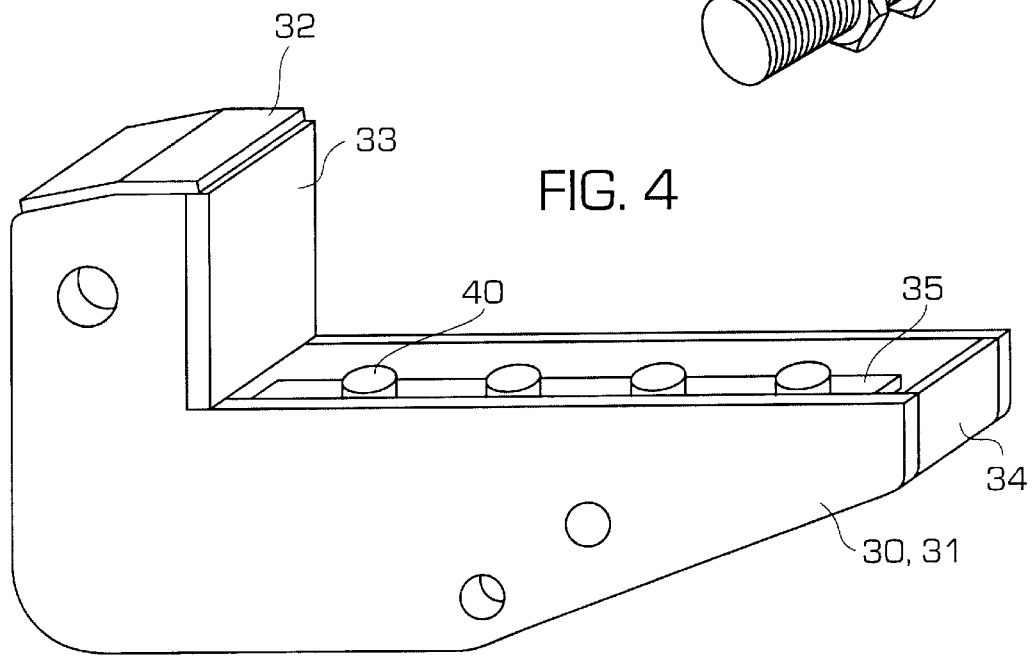

VEHICLE RESTRAINT SENSING SYSTEM

CROSS-REFERENCE

This application is a continuation in part of U.S. patent application Ser. No. 08/921,019 filed on Aug. 29, 1997.

I. BACKGROUND OF THE INVENTION

1. Field of the Invention

This invention relates to an improved system for sensing engagement of a vehicle restraint with a transport truck or trailer which is to be restrained.

2. Prior Art

U.S. Pat. No. 4,127,856 Bickel describes the use of electrical switches to sense the engagement of the vehicle restraint with a bar mounted on the rear of a vehicle. The use of signals indicating engagement of the locking device is now well known in the art. For example, the Rite-Hite "Dok-Lok", Serco "VR" and Kelley "Truk Stop" and "Star" all have models that sense contact with a vehicle ICC bar and generate signals for use by personnel at the loading dock. These techniques are mentioned or described in many U.S. Patents including, U.S. Pat. Nos. 4,267,748; 4,282,621; 4,488,325; 4,553,895; 4,692,755; 4,695,216; 4,759,678; 4,830,563; 4,843,373; 4,938,647; and U.S. Pat. No. 4,946,330.

One characteristic of all the previous devices is that the electrical switches generate a signal by the presence or absence of physical contact with a moving part. Thus in each device a switch senses a change in the position of a component of the restraining device. The switch does not directly sense the presence or absence of the bar mounted on the rear of a vehicle. While such systems generally function well, and provide useful information to the control system, there are two major deficiencies in all of the previous systems. First, the loading dock area and the rear end of trailers can be very harsh environment as a result of rain, snow, ice, road salt and other materials present at a loading dock. The devices described above use mechanical limit switches which have moving parts which can become corroded or made inoperative by ice, dirt or other debris. Even if the limit switch is an inductive proximity switch, all of the switches described are activated by the motion of a mechanical component of the restraining device, and are therefore subject to malfunction or false signal if one of the moving components should become broken or stick from corrosion or other foreign matter.

For example, in the device proposed by U.S. Pat. No. 4,488,325 the sensor plate mounted on the hook shank trips a switch located in a recess below it and the entire sensor structure is exposed and subject to damage. Moreover, because the sensor plate has a pivot point within the shank length of the hook there is a lack of sensitivity at the pivot point. ICC bars exist in a number of different configurations and are typically deformed in use. Thus there is no assurance that a sensor plate of the type used in the '325 patent will provide a positive signal indicating engagement for the spectrum of ICC bars that exist.

In addition, the switch may be generate a false signal if the moving component is activated by foreign material, such as a broom handle or wood from a broken pallet, rather than the bar mounted on the rear of a vehicle.

II. SUMMARY OF THE INVENTION

This invention, in one group of preferred embodiments, uses an array of inductive proximity switches to directly sense the presence of a metal bar without the use of any moving sensor components. Thus the sensing device is free from the effects of corrosion, and cannot be activated by non-metallic debris. Another advantage of using proximity switches is that the bar can sense within a limited distance of the hook surface and does not require actual contact. This characteristic is useful in preventing loss of signal caused by momentary loss of contact as the truck bounces relative to the hook during the loading operation.

Inductive proximity switches per se are well known, but heretofore not used in this application in the absence of a moving part to serve as the sensor to determine engagement. The main advantage of their use is the lack of moving parts and ability to operate in harsh environments. Typically they have a cylindrical sensing envelope which is dependent on the diameter of the sensing face. Common sizes are available with diameters from 8 to 30 millimeter and with sensing ranges up to 20 mm (⅝ inches). The sensor may be mounted in a rectangular housing, but the sensing envelope usually remains cylindrical. There are other configurations of proximity switches specifically designed for applications such as bottling lines, but they are highly specialized and are usually much more expensive.

A typical commercial proximity switch consists of a threaded cylindrical housing, as shown in FIG. 3, which may be constructed of stainless steel, brass or plastic. Several electrical components are encapsulated within the cylinder and usually an oscillator circuit to create a magnetic field, a voltage regulator to provide a constant voltage to the oscillator circuit, and a transistor to switch current. The introduction of a mass of conductive material into the magnetic field will alter the field and damp the oscillator, causing a detectable decrease in the current through the oscillator circuit. The resultant change in voltage will cause the transistor to change state. The proximity switch will thus prevent or allow current to flow depending on whether the proximity switch is designed to be normally-open or normally-closed.

Additionally, the sensor may have the configuration of a single inductive loop spanning the target zone on the hook or multiple sensing coils, circuitry may be employed to provide compensation for variations in sensitivity caused by extreme temperatures. The sensor may be used with a variety of hooks, both single and dual.

Further, in accordance with another preferred embodiment of this invention the sensor structure is completely embedded within a sensor bar that moves in response to contact with the vehicle. As a result issues of cost of multiple sensors, sensitivity and placement of the sensors are eliminated. Further, in accordance with the broader aspects of this invention exposure and potential damage of the sensors or plates is also eliminated.

This invention will be described in greater detail by reference to the attached drawing and the description of the preferred embodiments that follow.

III. BRIEF DESCRIPTION OF THE DRAWING

FIG. 2 is a side view illustration of a vehicle restraint hook showing various positions of engagement with the bar on the rear of a transport vehicle;

FIG. 3 is a perspective view of a typical inductive proximity switch;

FIG. 4 is a perspective view of a vehicle restraint hook with a number of proximity switches mounted between the side plates of the hook;

IV. DESCRIPTION OF THE PREFERRED EMBODIMENTS

Figure 1:
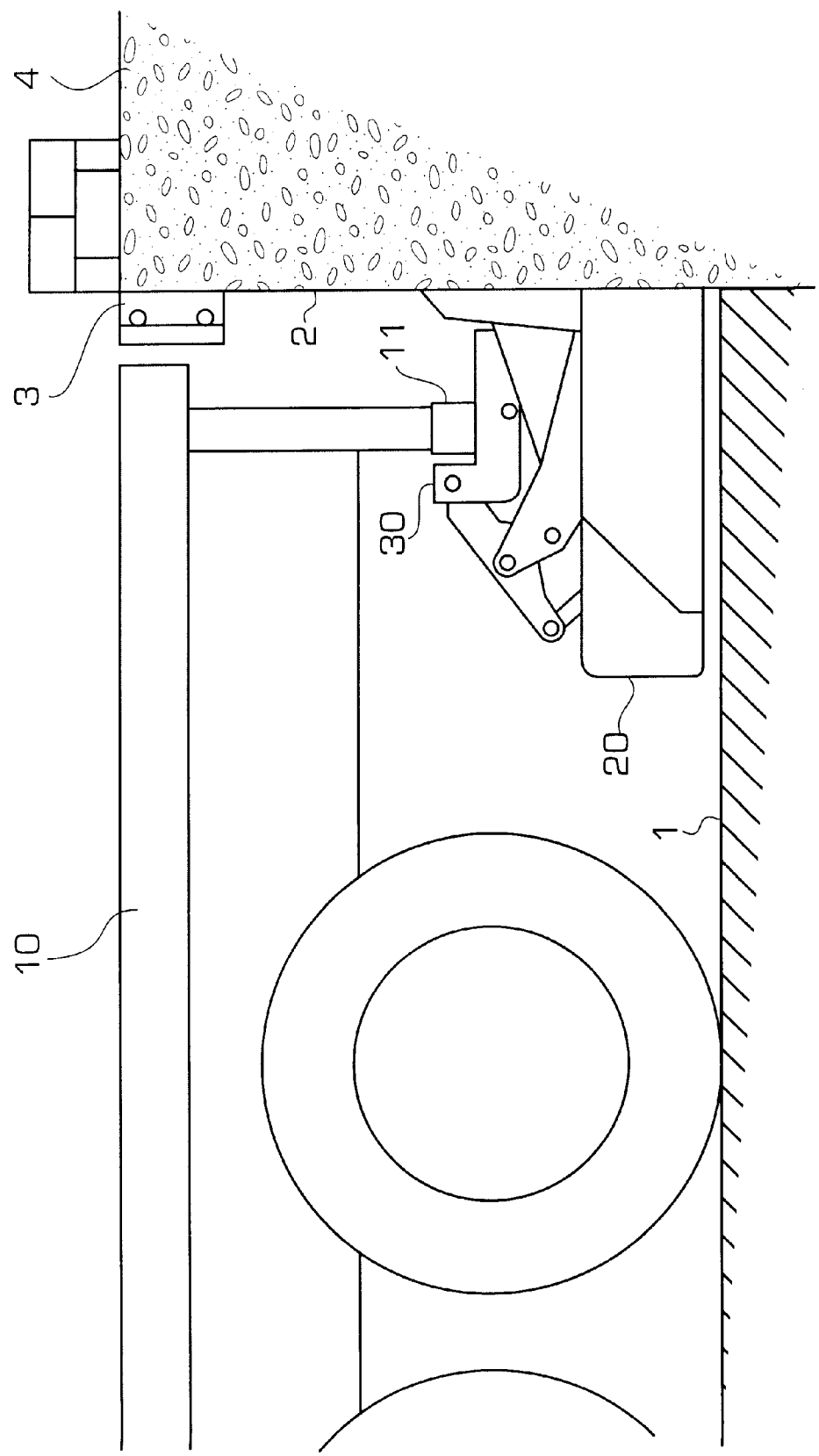
FIG. 1 illustrates a vehicle restraint with hook engaging bar on rear of transport vehicle.

Referring now to FIG. 1, a transport vehicle 10 parked adjacent to a building with the driveway 1, dock wall 2, bumper 3 and building floor 4 is illustrated. A vehicle restraint has a frame or housing 20 and is mounted to the wall (or alternatively to the driveway 1) and has a hook assembly 30 engaging the bar 11, also known as the ICC bar, attached to the rear of the vehicle. As shown in FIG. 2, when the vehicle restraint hook 30 engages the bar 11, the contact point may be anywhere along the horizontal portion as shown by alternate positions 11A and 11B. Each of these positions, and indeed anywhere on the horizontal surface of the hook is a position where the ICC bar 11 may contact the hook and needs to be sensed.

FIG. 3 shows a typical cylindrical proximity switch comprising a threaded cylindrical housing 40, nuts 41 to secure the housing in a suitable mounting hole, and an electrical cable 42. A single proximity switch has a small sensing area so that the presence of the bar would be detected only if it fell within a predetermined distance of the proximity switch. A single switch could not sense all of the bar positions shown in FIG. 2. FIG. 4 illustrates the hook with an array of proximity sensors 40 placed between the side plates 31 and the end tip 34 of the hook assembly so that the bar 11 cannot contact the horizontal surface of the hook without being within the sensing range of at least one of the switches. The sensors are placed below the contact surface of the hook on a plate 35 and are not subjected to impact from the bar. The hook is completed by cover plates 32 and 33.

Figure 5:
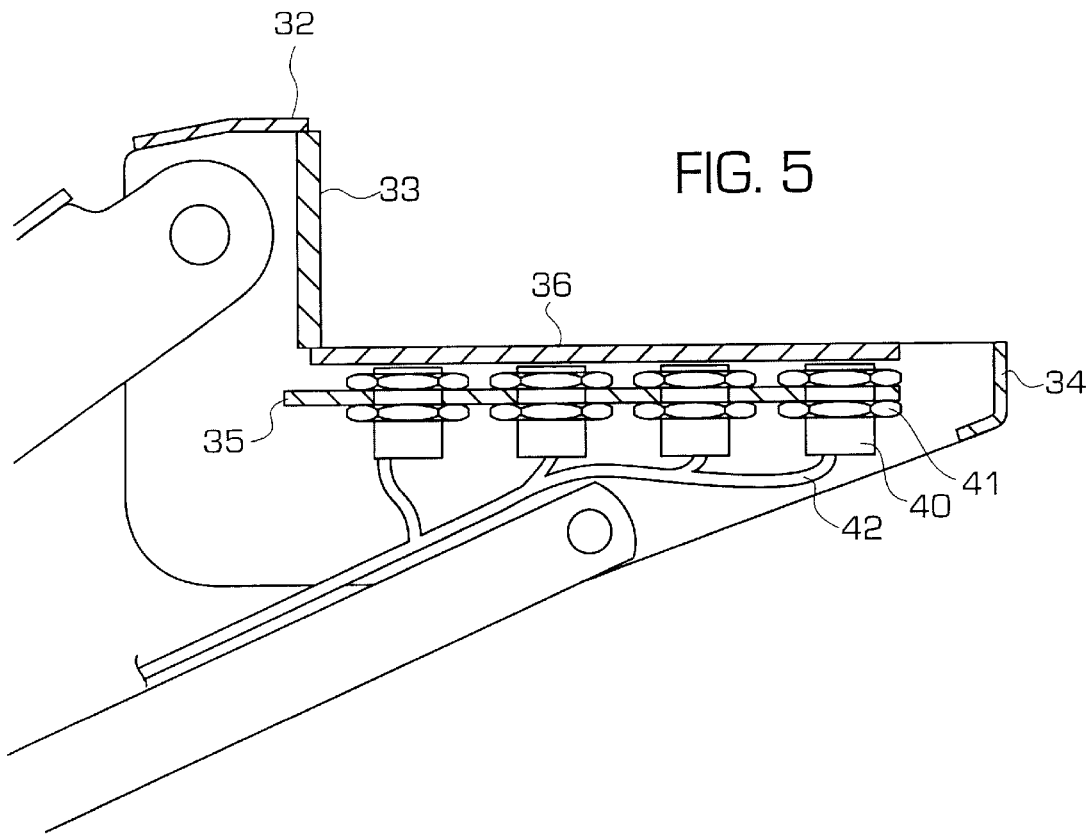
FIG. 5 is a sectional view of the hook assembly showing the mounting of the proximity switches and protective cover.

FIG. 5 shows the proximity switches 40 mounted through holes in the plate 35 and secured by the nuts 41. The electrical cables 42 are routed through the vehicle restraint mechanism to terminal connections not shown. Although proximity sensors are usually of rugged construction, ideally they should be protected from physical impact and abrasion. Protection can be achieved by providing a cover plate 36 of a tough but non-conductive material such as a strong plastic. Additionally, other components of the hook may be made of a plastic material to provide greater sensitivity for the proximity switches to the ferrous ICC bar.

Figure 6:
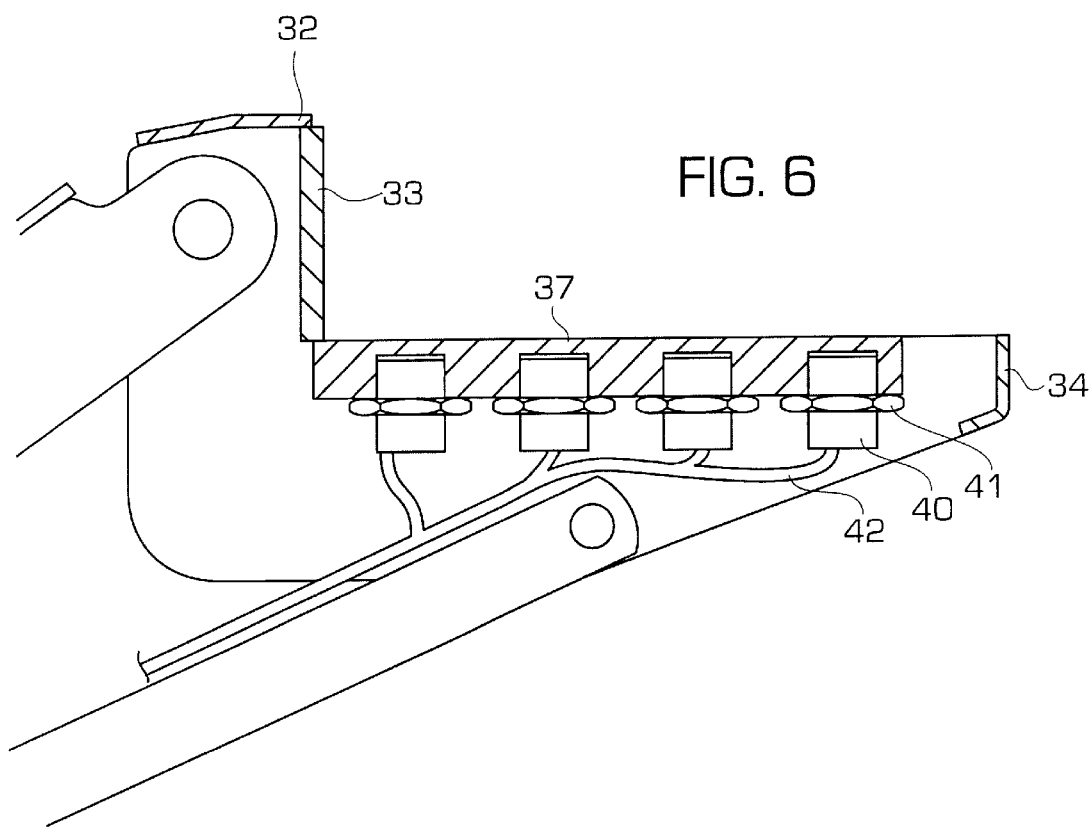
FIG. 6 is a sectional view of the hook assembly showing the mounting and protective cover combined.

FIG. 6 shows an alternate configuration which combines the protective cover 37 with the mounting plate. The proximity switches are threaded into the bottom surface of the plate and secured by the nuts 41. Alternatively, the proximity switches may be potted as an integral component comprising an array of switches and an elastomer or plastic insert which is mated to the inside cavity of the hook and secured in place.

Figure 7:
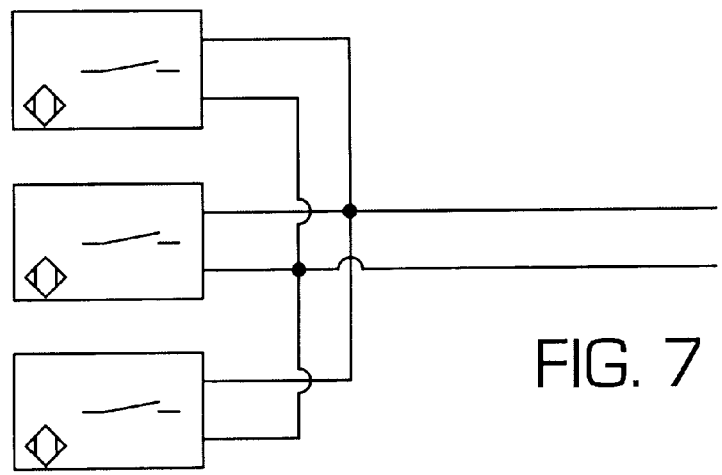
FIGS. 7, 8, 9, 10 are electrical circuits illustrating various interconnection configurations.
Figure 8:
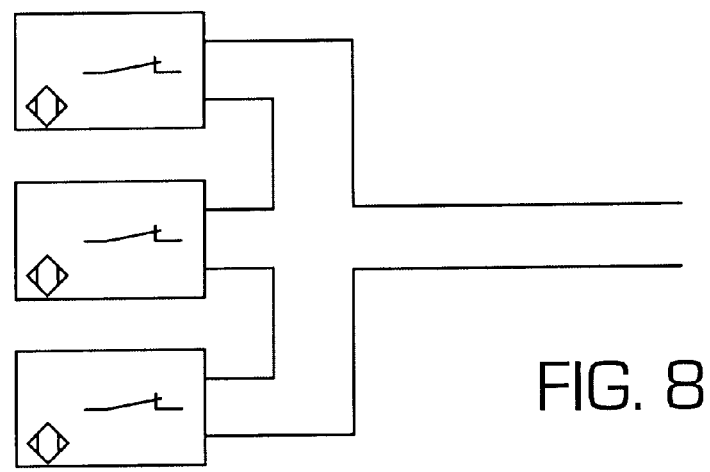

The use of a number of normally-open switches connected in parallel, shown schematically in FIG. 7, or normally-closed switches connected in series, shown schematically in FIG. 8, would allow a signal to be transferred by two conductors to the control system. Either circuit may be used and it is apparent that the number of proximity sensors is thus only a function of hook configuration and the sensitivity to be achieved.

Another preferred embodiment uses a type of proximity sensor known as an analogue sensor. This device is simpler than a proximity switch because it has an oscillator circuit but no voltage regulator or transistor and relies on an external controller for voltage regulation and signal detection. The current conducted by the device decreases in proportion to the degree of damping of the oscillator circuit caused by the proximity of a conductive mass. These characteristics are well suited for use with a programmable logic controller or PLC, for the input circuitry of a PLC typically has a controlled voltage and the ability to detect changes in current. Several analogue sensors connected in series, shown schematically in FIG. 9, would conduct current which would be relatively higher when in a free state than when the proximity of a mass of conductive material damped the oscillator of one of the sensors.

Figure 9:
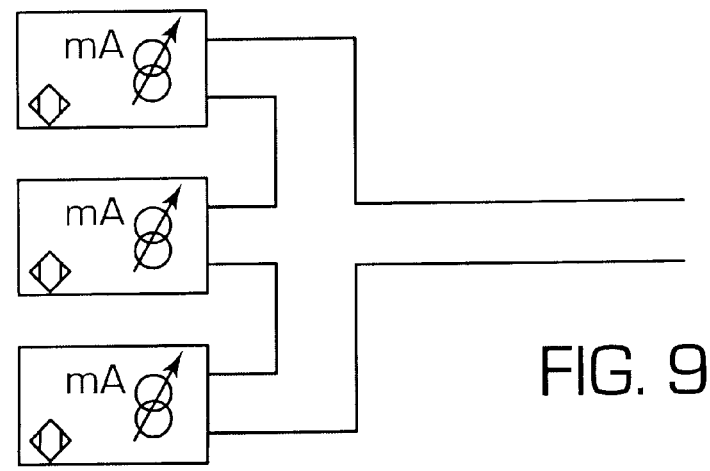
Figure 10:
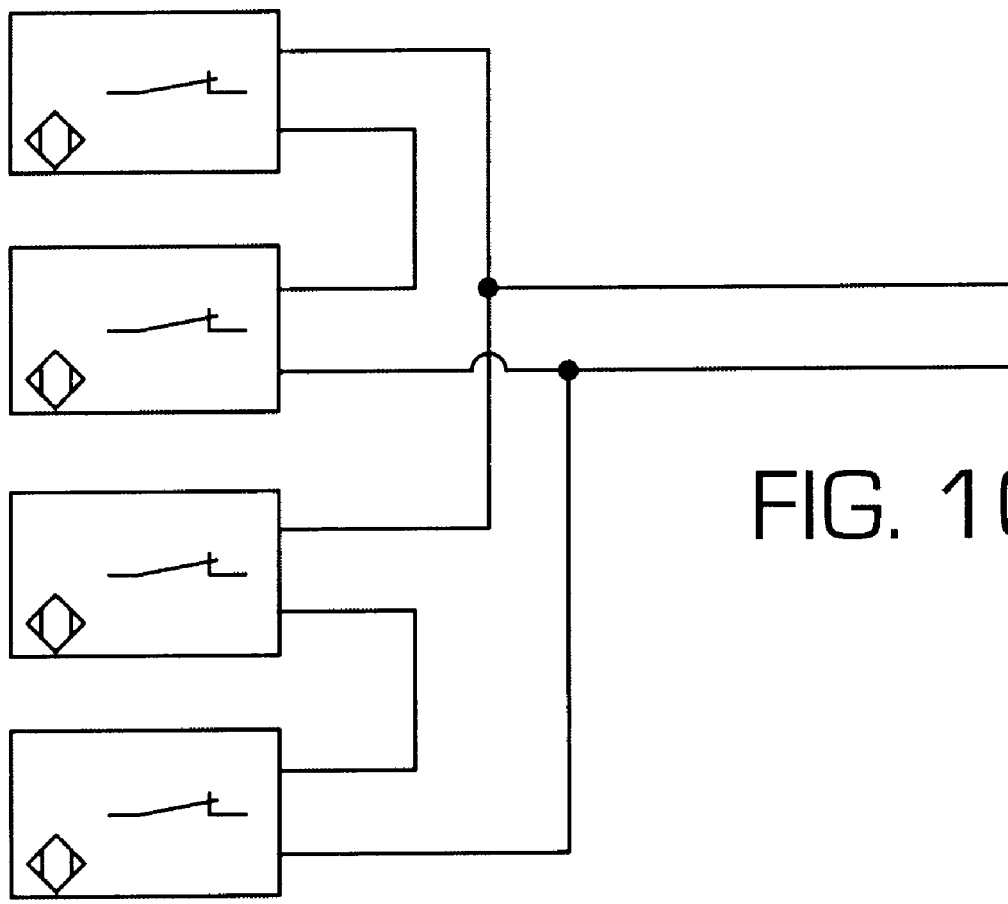

Although FIGS. 7, 8, & 9 show three sensors in parallel or series, the actual number of sensors would be determined by the size of the hooking envelope and the range of the sensors. The selection of the actual sensor and the wiring configuration would be determined by the voltage of the power source and the voltage requirement of the sensor. For example, if the power source is 24 volts and the sensor requires 12 volts, four sensors could be used by connecting them in series and parallel as shown in FIG. 10.

Figure 11:
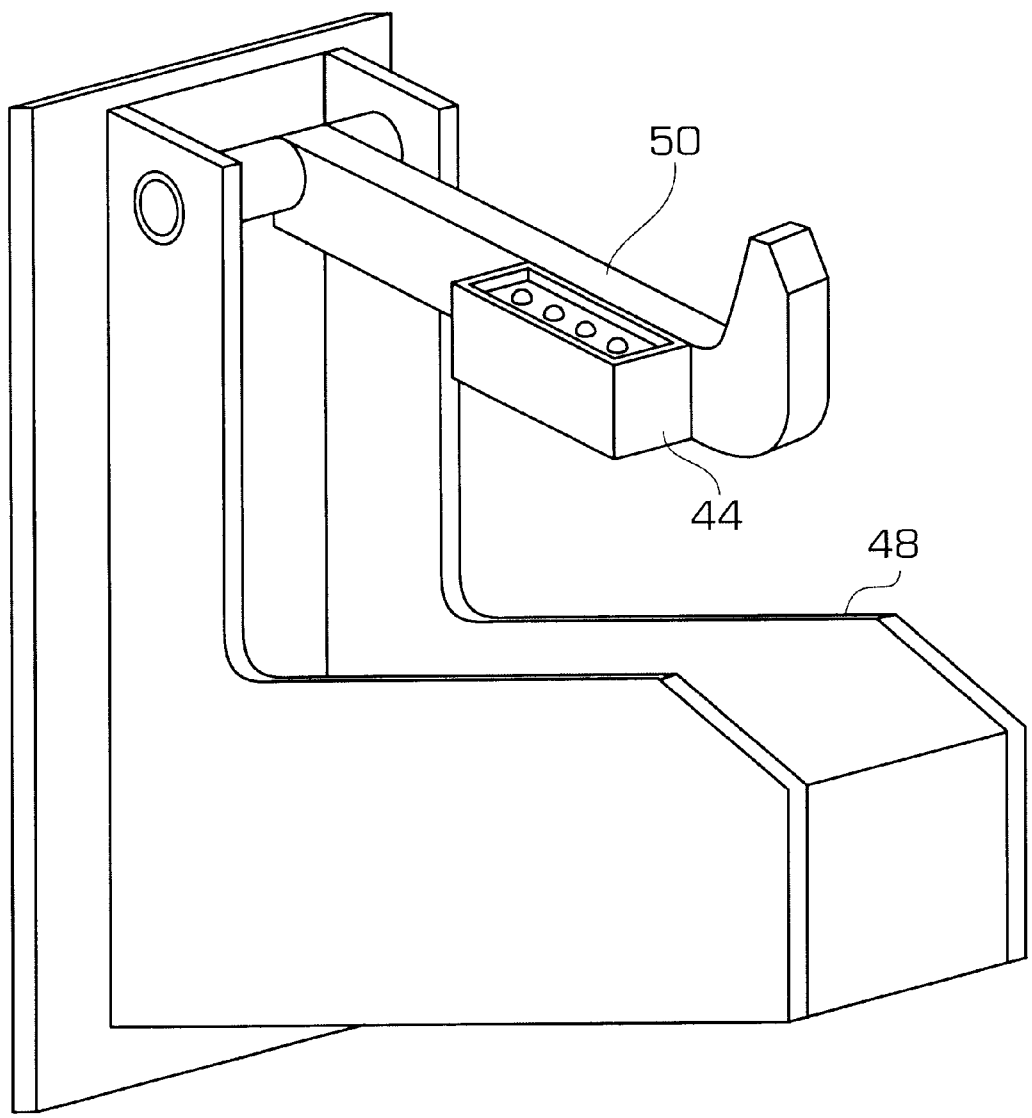
FIG. 11 is a perspective view of proximity switches mounted on a side of a vehicle restraint with a single rotating hook.
Figure 12:
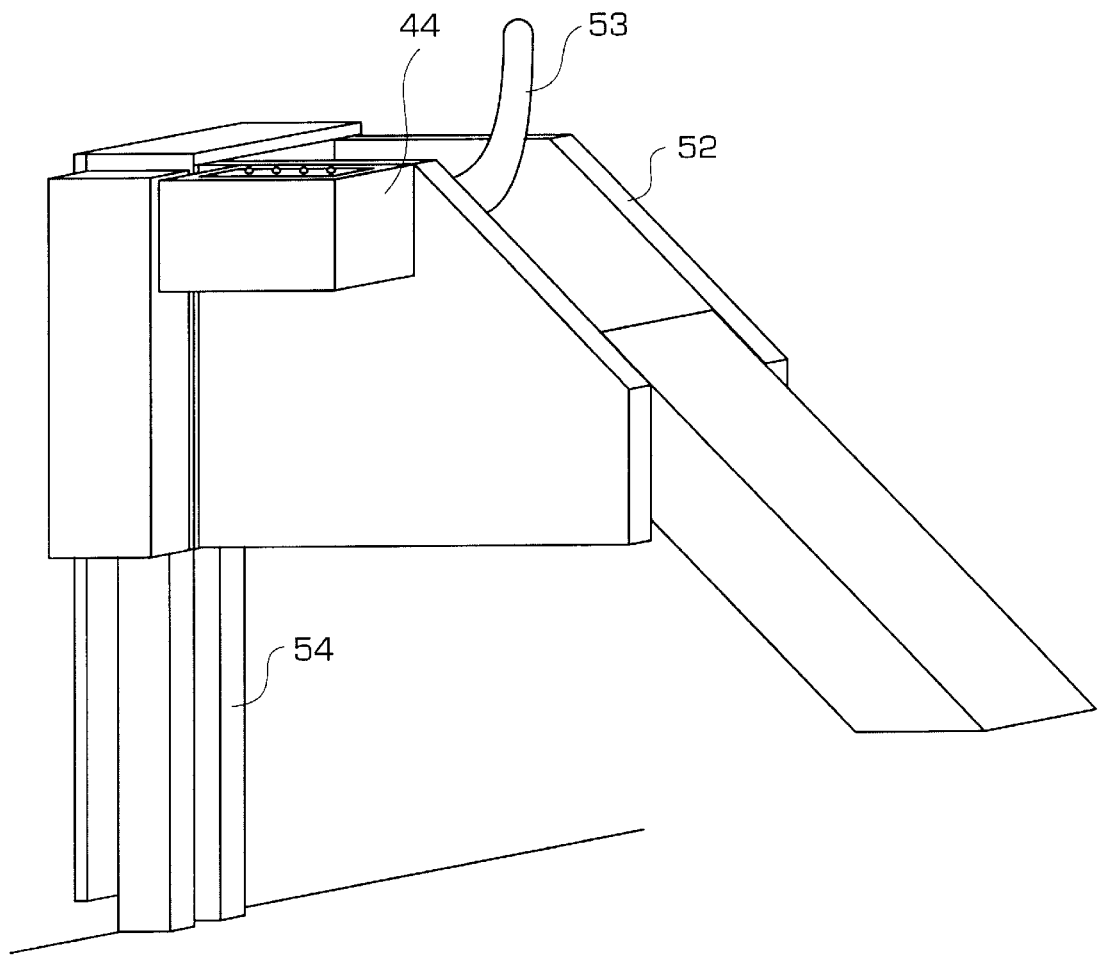
FIG. 12 is a perspective view of proximity switches mounted on the side of a vehicle restraint with a vertical traveling carriage.

Although the vehicle restraint hook shown in FIGS. 2, 4, 5 & 6 have the sensors mounted between the side plates of a vertically moving hook assembly, the invention is suitable for many different mounting configurations. For example, FIG. 11 shows the sensors 44 mounted to the side of a single rotating hook 50. The hook 50 is mounted to a frame 48 FIG. 12 shows the sensors 44 mounted to the carriage 52 of a vehicle restraint which tracks vertically on a frame or track 54 mounted to the dock wall. A hook 53 is mounted for rotation on the carriage 52 and engages an ICC bar which is positioned on the horizontal top surface of the carriage. Physical protection can be achieved in many different mounting configurations by a suitable housing.

Figure 13:
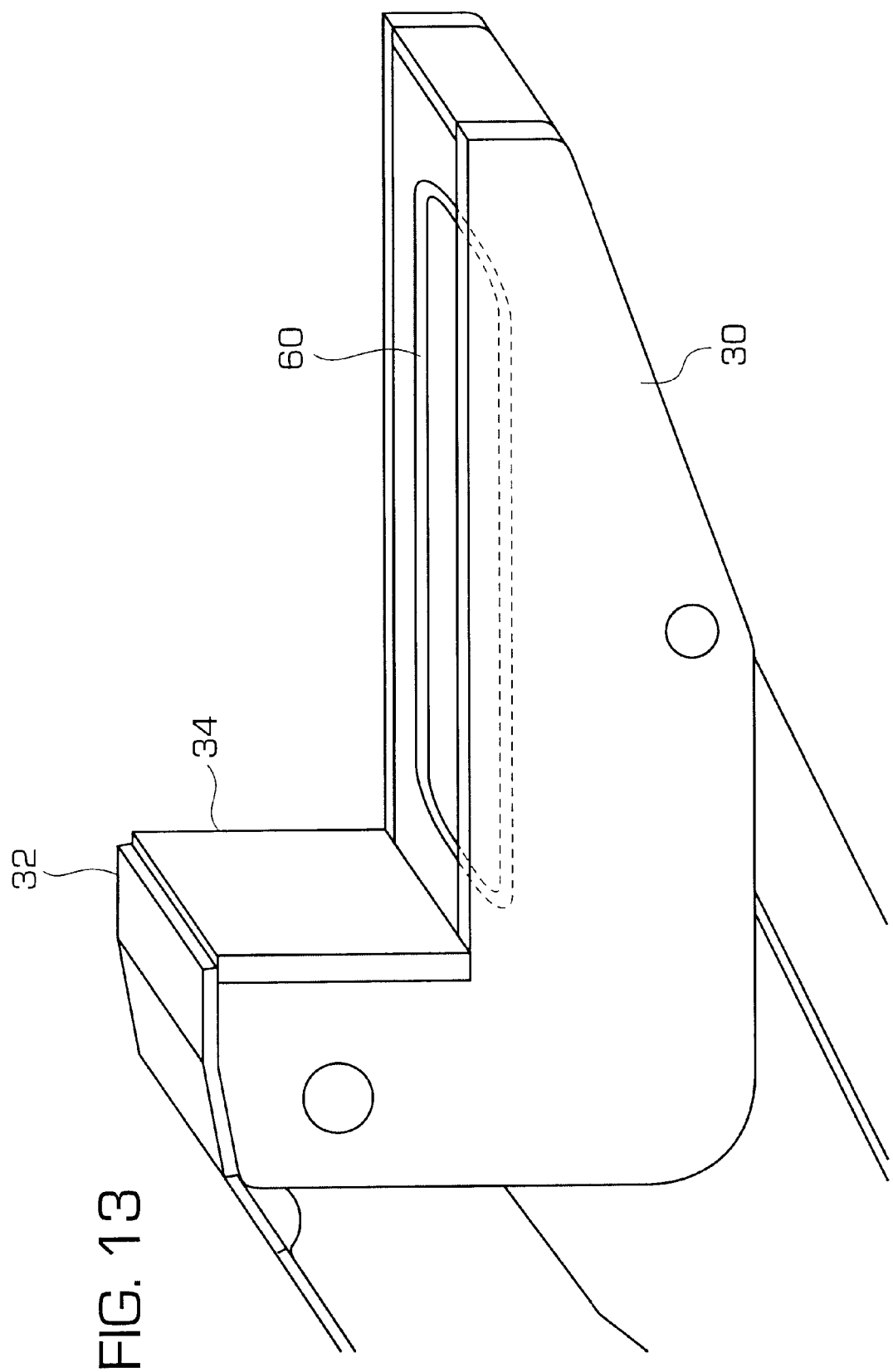
FIG. 13 is a perspective view of second preferred embodiment of a sensor using an inductive loop.

FIG. 13 illustrates the use of an inductive loop 60 mounted in the cavity of a hook 30. As in the case of the proximity sensors, the inductive loop 60 would be protected by a non-conductive cover to prevent physical damage. The inductive loop, like the proximity sensor senses a change in frequency of an oscillator caused by conductive material, i.e. the ICC bar, entering the magnetic field of the sensor. In the case of the proximity switch the electronic circuit is usually a part of the sensor itself. In the case of the inductive loop, it is generally a separate circuit element physically separate from the loop.

Figure 14:
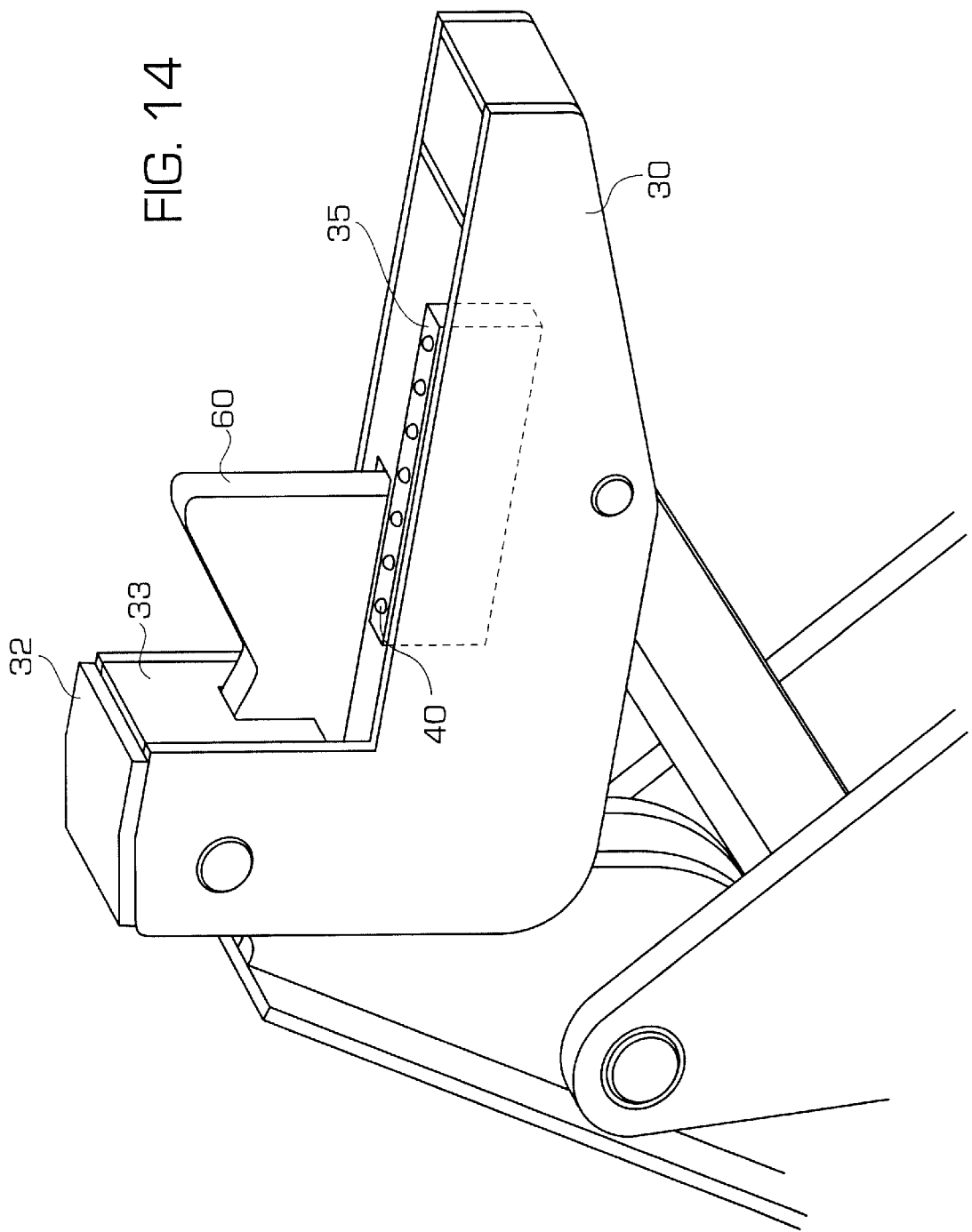
FIG. 14 is a perspective view of a third preferred embodiment of a sensor used in conjunction with a hook having primary and secondary hooks.

FIG. 14 illustrates the use of this invention in conjunction with a dual hook restraining device. Such vehicle restraints are known per se in the Serco VR series. In this device the secondary hook 60 is pivotally mounted to minimize the runoff of the hook relative to the portion of the vehicle engaging the hook. Thus, by reference to FIG. 2, an ICC bar 11 would not impact the secondary hook 60 and the presence of that hook prevents the vehicle from moving outward the horizontal distance to the vertical face 33. However, if the ICC bar is positioned at location 11A in FIG. 2, the secondary hook 60 will rotate downward so that the face 33 restrains outward movement of the vehicle.

In this third preferred embodiment the plate 35 holding the sensors 40 is displaced to one side of the secondary hook to sense the presence of the bar throughout the horizontal range of engagement. This includes the portion of engagement for the secondary hook 60. The sensor array does not have to span the entire surface of the hook because it has sufficient sensitivity with in the magnetic field to determine the presence of the ICC bar. While the sensors 40 are illustrates as all the same size, those elements positioned in front of the secondary hook may be configured differently to provide more sensitivity.

Figure 15:
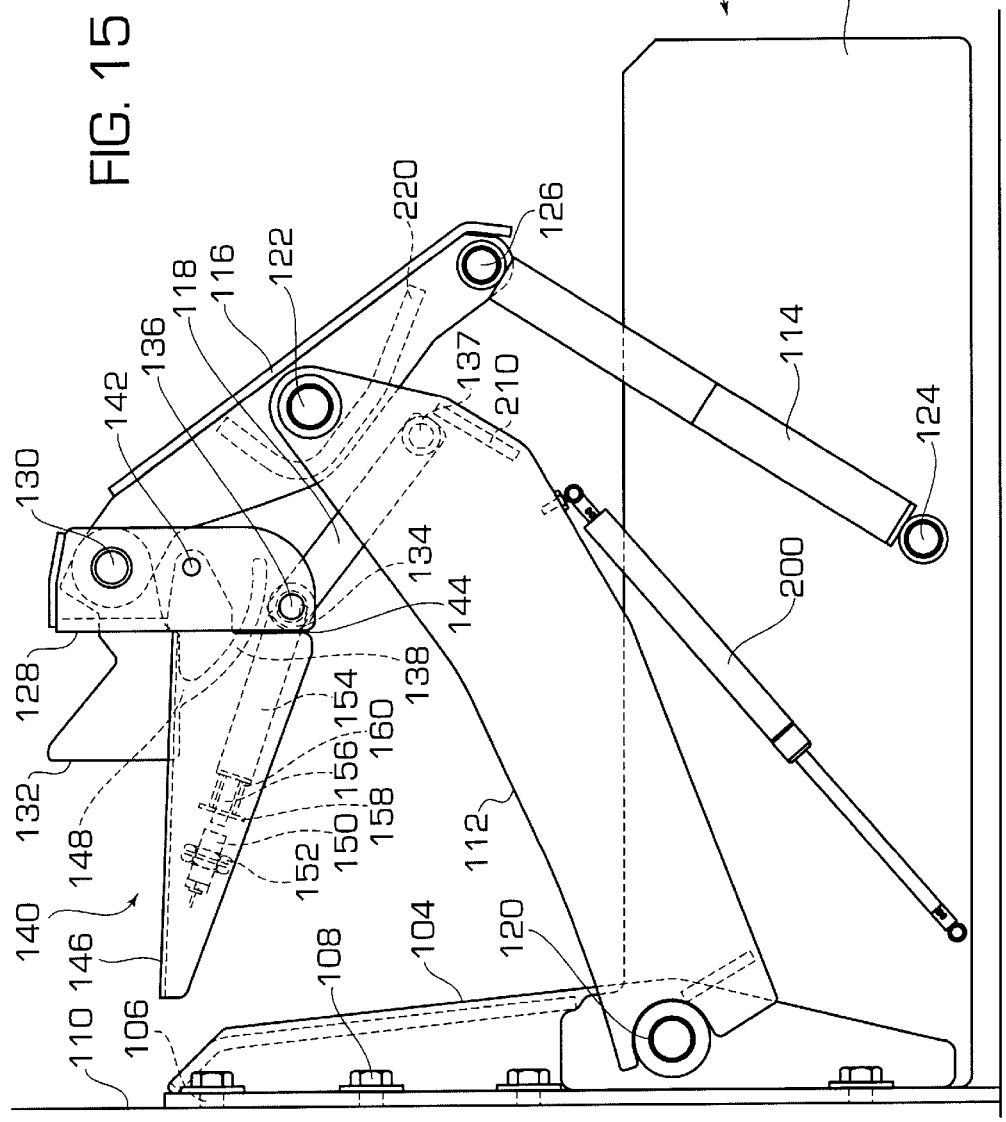
FIG. 15 is a side view of a fourth preferred embodiment of this invention.

Referring now to FIG. 15 a fourth preferred embodiment of this invention is illustrated. A frame 100 includes a housing 102 and a backframe 104. The backframe has a series of holes 106 with anchor bolts 108 to facilitate mounting to the wall 110 of a loading dock. While not illustrated, the device may be ground mounted by the use of legs attached to the bottom of the housing 102.

The linkage of this device will now be described. It is essentially the 4-bar linkage of the Serco VR restraint, as described in U.S. Pat. No. 5,120,181 with an important difference to be explained herein. The linkage comprises a main arm, 112, an arm strut 114, an upper arm 116 and a hook strut 118. The main arm is pivotally coupled to the frame at pivot pin 120. While FIG. 15 illustrates in side view one arm 112, the main arm comprises two such arms mounted to pivot pin 120 and attached to each side of the upper arm 116 at pin 122. The arm strut 114 is pivotally mounted to the housing 100 by pivot pin 124 and to the upper arm by pivot pin 126.

The restraint mechanism comprises a vertical member coupled to the upper arm by pin 130. The vertical orientation of the member 128 is maintained by means of hook strut 118. Hook strut 118 is coupled between the main arm 112 and the vertical member 128 by pins 136 and 137. The Serco VR device had a hook structure with a rigid hook having a horizontal portion as an integral portion. In this fourth preferred embodiment there is no horizontal portion of the hook. The orientation of the restraint member to achieve engagement with a vehicle and maintain that orientation is achieved by having the 4 bar linkage couple the vertical blocking member to the hook strut.

The primary restraint is the member 128. A secondary hook 132 pivots about pin 130 and is spring loaded by a coil 134 about pin 136. The end of the spring 134 is fixed to a guide 138 which extends the spring 134 when the secondary hook 132 is depressed. By this technique dual hooking positions are achieved minimizing the distance a vehicle may move away from the dock 110 before restraining action occurs.

A gas spring 200 is coupled between the main arm 11 and the housing 102 to upwardly bias the linkage and the hook assembly. The gas spring has sufficient force so that it can support the assembly with an excess upward force in the range of 70 lbs. yet be responsive to up and down movements of the vehicle during loading-unloading conditions (float) to maintain the restraint in engagement. It will be understood that a second gas spring will typically be mounted to the second main arm. While not illustrated the unit may be powered up or down into position and mechanically latched in a retracted position in the housing. Reinforcement and brace members 210, 220 may be added to the device as required.

The sensor comprises a pivoting bar 140. This bar is mounted to the vertical member 128 by pivot pin 142. The contour of the bar 140 is such that at the interface with the vertical member a lever arm exists within the vertical member permitting pivotal motion about pin 142. Thus the pivot point 142 is placed a distance from the restraining wall of vertical member to provide a sufficient lever arm permitting rotation of the sensor bar where ever it is impacted by the vehicle. The sensor bar 140 is a unitary element having a solid upper face 146 with the exception of a cutout 148 for the secondary hook 132.

The sensor bar 140 serves as the internal housing and mounting for a switch 150 that is affixed to the sensor bar by means of a support plate 152. The switch may be of the proximity type illustrated in FIG. 3. Mounted in the sensor bar, the switch 150 moves with the sensor bar 140 as that element pivots about pin 142. An arm 154 projects from pivot 136 and carries a target 156 at the other end. A target guide plate 158 is fixed to the interior of the sensor bar 140 and has a hole through which the target 156 passes. The arm 154 is biased by means of a spring 160 so that the sensor bar 140 is upwardly biased by virtue of the positioning of the guide plate 158. The target 156 is free to shift axially with respect to the hole in the guide plate as the sensor bar rotates.

In operation the vehicle, not illustrated will be backed into position against bumpers mounted to the wall 110 of the loading dock. Typically the ICC bar will be positioned over the restraint and the device will be released to raise into position, upwardly biased by the gas springs 200. When the sensor bar 140 contacts the ICC it will rotate about pin 142 in a counterclockwise direction, downward. This in turn will decrease the distance between the switch 150 and the target 156, i.e. the target will move inward relative to the guide plate 158 as the sensor bar rotates counterclockwise. As a result a signal indicating engagement will be generated by the switch. Since the entire unit is upwardly biased by the gas spring 200, further downward force will result in the entire hook and linkage structure moving downward but engagement with the ICC bar is still maintained. The distance between the switch 150 and the target 158 remains constant such that the engagement signal is still generated. If the vehicle is being unloaded, the unit will tend to move upward. However, the spring force of the gas spring is greater than that of the force applied to rotate the sensor bar so the entire unit moves upward following the vertical movement of the truck as a result of the upward bias of the gas spring.

If the device is actuated but does not contact the ICC bar, it will raise to the full extent of vertical travel of the linkage without any rotation of the sensor bar. In this case since there is no engagement with the vehicle no engagement signal will be generated. Additionally, since the engagement signal occurs because of positive rotation of the sensor bar there are no dead spots caused by ICC bar contact to the hook structure near the vertical member or the secondary hook.

It is apparent that modifications of this invention may be practiced without departing from the scope of this invention.

I claim:

1. A vehicle restraint comprising: a frame mountable relative to a dock face, a linkage mounted to said frame for moving a restraining structure in a vertical manner between a stored position and a restraining position, said linkage comprising first and second arms pivotally connected to said frame, a third arm coupling said first and second arms to said restraining structure, a fourth arm coupling said first arm to said restraining structure to maintain said restraining structure in a generally vertical orientation, said restraining structure comprising a vertical member forming a barrier for preventing outward movement of a vehicle and a secondary hook mounted to said vertical member and movable relative to said vertical member for engaging a portion of a vehicle and restraining movement of said vehicle, a sensor bar pivotally connected to said vertical member, said sensor bar determining engagement of said restraint structure with a portion of said vehicle, a sensor positioned within said sensor bar and movable therewith and not in contact with said vehicle and a target member mounted within said sensor bar and in proximity to said sensor to provide an indication of the displacement of said sensor bar as it pivots.

2. A vehicle restraint of claim 1 wherein said sensor comprises at least one proximity switch mounted in said sensor bar.

3. A vehicle restraint of claim 2 wherein said sensor bar comprises an elongated member facing inward toward said frame, said vertical member having an internal pivot pin and said sensor bar having a portion internal to said vertical member and positioned to allow rotation of said sensor bar about said pivot pin.

4. A vehicle restraint of claim 2 further comprising an arm mounting said target, said arm operatively connected at one end to said vertical member and extending inside said sensor bar.

5. A vehicle restraint of claim 4 further comprising a spring mounted on said arm.

6. A vehicle restraint of claim 1, further comprising a spring connected to said secondary hook and said linkage to bias said secondary hook into an upward position.

7. A vehicle restraint of claim 1 further comprising a gas spring connected to the main arm and said frame to upwardly bias said linkage.

\* \* \* \* \*